No. 790,707. PATENTED MAY 23, 1905.
M. SKLOVSKY.
DUST PROOF WHEEL BOX.
APPLICATION FILED MAR. 15, 1904.
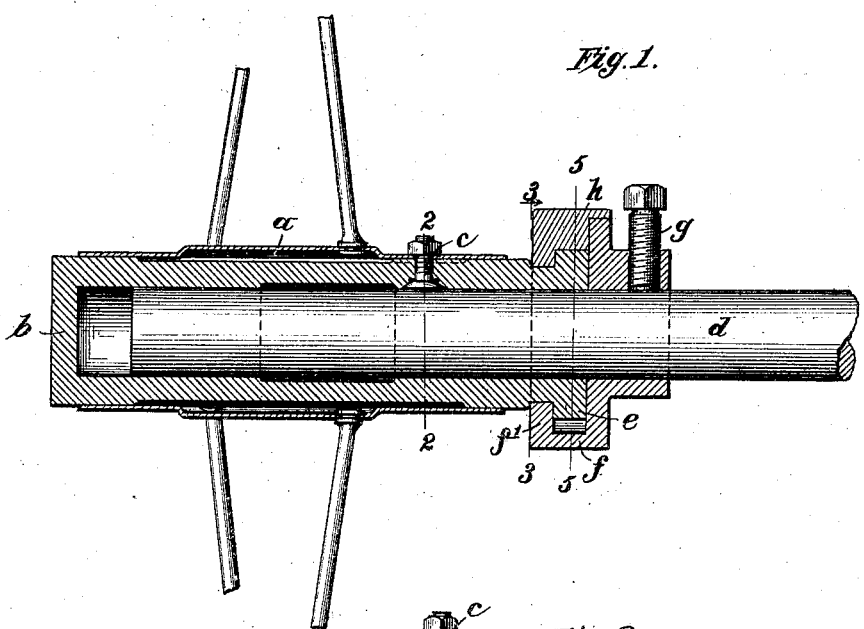
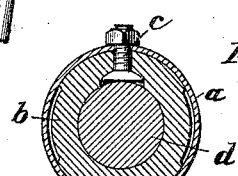
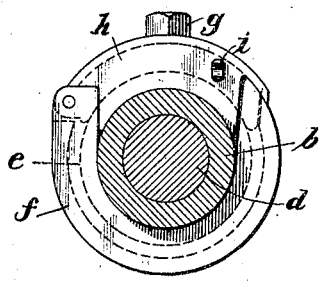 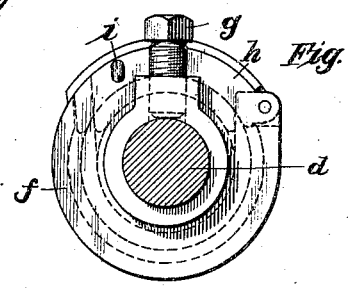
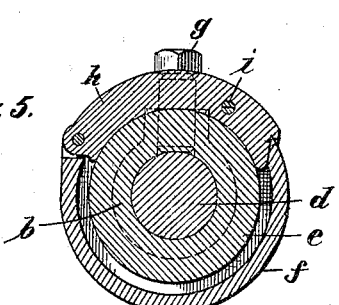
WITNESSES:
INVENTOR
Max Sklovsky
BY
his ATTORNEYS.

No. 790,707.

Patented May 23, 1905.

UNITED STATES PATENT OFFICE.

MAX SKLOVSKY, OF MOLINE, ILLINOIS, ASSIGNOR TO DEERE AND COMPANY, OF MOLINE, ILLINOIS, A CORPORATION OF ILLINOIS.

DUST-PROOF WHEEL-BOX.

SPECIFICATION forming part of Letters Patent No. 790,707, dated May 23, 1905.

Application filed March 15, 1904. Serial No. 198,296.

*To all whom it may concern:*

Be it known that I, MAX SKLOVSKY, a citizen of the United States, residing at Moline, in the county of Rock Island and State of Illinois, have invented certain new and useful Improvements in Dust-Proof Wheel-Boxes; and I do hereby declare the following to be a full, clear, and exact description of the invention, such as will enable others skilled in the art to which it appertains to make and use the same.

This invention consists of an improved axle-box which is especially valuable for plow-wheels, though it is applicable generally to wheels of other agricultural implements, wheeled bodies, and vehicles.

The invention has for its objects, first, attainment of a practically perfect dust-proof bearing; second, facility for lubrication and provision for maintaining a constant supply of oil within the box, thus dispensing with the necessity of frequently removing the wheel from its spindle for greasing the latter; third, capability of renewing the oil-supply without removing the wheel, and, fourth, provision of simple and efficient means for assembling or detaching the parts and for operatively uniting the wheel to its spindle without interference with the dust-proof and lubricating features. These objects are attained by means substantially as illustrated in the accompanying drawings, wherein my invention is represented applied to the hub of a plow-wheel, though it is understood that the invention is not limited to this or any specific embodiment.

In said drawings, which are to be taken as a part of this specification, and in which corresponding parts in the different figures are indicated by the same reference characters, Figure 1 is a central longitudinal section of a wheel-hub embodying my invention, showing the hub mounted on its spindle, which appears in elevation. Fig. 2 is a transverse section on line 2 2 of Fig. 1. Fig. 3 is a transverse section on line 3 3 of Fig. 1 looking in the direction of the arrow with parts behind the line appearing in elevation. Fig. 4 is an end elevation looking toward the inner end of the hub. Fig. 5 is a transverse section on line 5 5 of Fig. 1.

In the illustrated device the wheel-hub $a$ has its bushing or axle-box $b$ secured therein by countersunk bolts $c$, inserted through the box and hub. The box is represented fitted on its spindle $d$. It is closed at its outer end, thus rendering it dust-proof at that point and preventing escape of oil. As the spindle does not extend quite to the outer end of the box, a space or chamber is thus afforded there for reception of oil. At its inner end the box has a shoulder $e$, which fits and turns freely within an annular socket of a dust-proof cap $f$, which is rigidly secured to the axle or spindle by a set-screw $g$, tapped through a collar on the cap. The swivel-coupling here afforded is such as to permit free rotation of the hub on its spindle, while preventing lateral play. In the present instance the outer flange $f'$ of the cap fits also within an annular depression around the box, which increases the dust-proof quality of the joint, though this feature is not essential. The cap serves not only to keep the bearing free from dust, but its socket acts also as an oil-cup, in which a sufficient quantity of oil can be maintained to supply the spindle constantly. Distribution of the oil takes place as a result of the rotation of the shoulder $e$ within this oil-cup. In a plow-wheel lubrication is further facilitated by reason of the fact that the wheel is usually staggered, so that the spindle is disposed at a downward incline toward its outer end. The cap $f$ has a removable segment $h$, formed substantially as a continuation of the socket portion thereof and here shown hinged at one end to the cap and rigidly secured therein by a pin or cotter $i$, inserted transversely through the segment and the inner vertical side of the cap. The supply of oil can be renewed at any time merely by raising the segment and pouring in the oil. Said segment has a side lip covering the periphery of said inner side of the cap to prevent the entrance of dust at the joint, and it has at its free end a lip extending over the edge of the cap for the same purpose. The combined cap and collar thus described serve to hold the wheel-hub operatively on its spindle and provides simple and efficient means for assembling or disconnecting the parts. The wheel can be taken from its spindle when necessary by loosening the set-screw $g$. When the spindle is withdrawn from the box, the hinged segment $h$ can be opened and the box readily withdrawn from its socket.

I claim as my invention and desire to secure by Letters Patent of the United States—

1. The combination of a dust-proof axle-box adapted to rotate on its spindle and closed at its outer end and having an annular flange at its inner end, and a collar adapted to be secured on the spindle by means of a set-screw and formed integrally with a cap having an annular socket in which said flange is swiveled, said socket being of larger internal diameter than the diameter of said flange to provide an oil-chamber, and said cap having a hinged top segment constituting a part of the socketed portion thereof and adapted to allow detachment of the flange from said socket but of considerably less length than half the circumference of the cap, and means for securing said hinged segment in place.

2. The combination of an axle-box adapted to rotate on its spindle and having an annular flange at its inner end, a collar adapted to be secured on the spindle by means of a set-screw and having a cap with an annular socket in which said flange is swiveled, said cap having a hinged segment constituting a part of the socketed portion thereof and formed with side and end lips overlying the joints between the cap and segment, and a fastening-cotter inserted transversely through said segment and the inner vertical side of the cap.

3. The combination of an axle-box adapted to rotate on its spindle and having an annular flange on its inner end, and a collar adapted to be secured on the spindle and having an integral cap with an annular socket in which said flange is swiveled, said socket having a top segmental opening of about one-third the circumference of the whole socket and adapted to permit detachment of the flange, and said cap having a top segment hinged at one end of said opening and covering the same and constituting a part of said socket, and a fastening device at the free end of said segment for securing it in place.

In testimony whereof I affix my signature in presence of two witnesses.

MAX SKLOVSKY.

Witnesses:
   CHAS. H. POPE,
   SCHILLER HOSFORD.